United States Patent Office 3,548,687
Patented Dec. 22, 1970

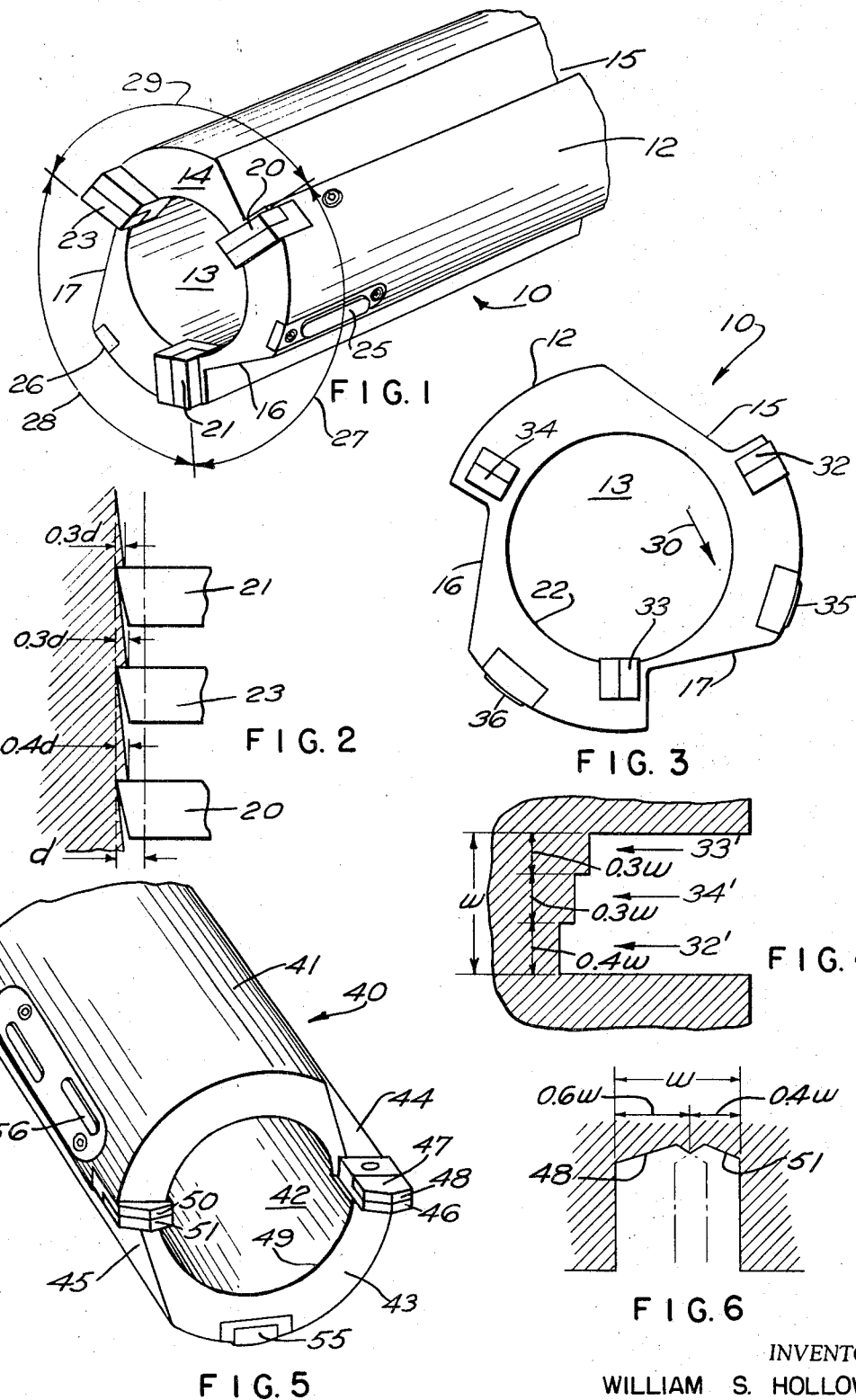

3,548,687
TREPANNING DRILL TOOL
William S. Holloway, Cumberland Hill, R.I., assignor to Madison Industries, Inc., a corporation of Rhode Island
Filed May 17, 1968, Ser. No. 730,168
Int. Cl. B23b 51/04
U.S. Cl. 77—69           3 Claims

ABSTRACT OF THE DISCLOSURE

A trepanning drill for deep drilling, having a plurality of separated cutting edges located at the end of a cylindrically tubular body, the cutting edges being arranged to each take a portion of the annual cut and with the cutting edge of the control cutter taking the greatest load to provide a primary reaction force being supported by wear pads so that the wear pads and the control cutter serves as a guide contacting the outer diameter of the annular cut to guide the tool as it progresses through the work.

BACKGROUND OF THE INVENTION

Trepanning drilling tools generally have a single cutting edge with wear pads to support the tool and guide it into the annular cut being made. Tools of this configuration experience the difficulty of not being able to maintain accurate alignment because of the load which is encountered by the single cutting edge. In some cases, as for example as shown in the Jehle Pat. 3,244,035, the cutting is divided into two diametrically opposed cutting edges one which extends from the large diameter of the annular cut inwardly a part way, while the other extends from the inner diameter of the annular cut outwardly there being a slight overlap so that all of the material will be removed and in this arrangement the inner cutting edge is equal to or wider than the separately formed outer cutting edge and does not maintain accuracy of alignment where a deep hole is to be made.

SUMMARY OF THE INVENTION

In this invention a plurality of cutting edges are provided in which one cutting edge takes a greater load than one or more other cutting edges, thus creating a main or control cutter and to cause this cutter to act as one of three guiding means since the dominant thrust from this cutting edge is supported by wear pads located in a balanced relation. Thus this control cutter together with the wear pads acts to accurately guide the drill through the work. One or more additional cutters are located about the drill body to assist in partially relieving the load on the main cutter.

BRIEF DESCRIPTION OF THE DRAWINGS

FIG. 1 is an oblique end view of one embodiment of the invention;

FIG. 2 is a diagrammatic view illustrating one possible relationship of three cutters relative to the depth of cut which is taken by each for each revolution;

FIG. 3 is an end view on a somewhat larger scale of another embodiment;

FIG. 4 is a diagrammatic view illustrating the relationship of the cutters of FIG. 3 as to the width of cut being removed by each;

FIG. 5 is an end view of a further modified form of tool; and

FIG. 6 is a diagrammatic view similar to FIG. 3 of the relationship of the cutters shown in the form illustrated in FIG. 5.

DESCRIPTION OF THE PREFERRED EMBODIMENTS

The illustrated three cutter embodiments of the invention shown in FIGS. 1 and 3, comprise a drill body 10 which may be mounted on the end of a drive shank, the drill body having an outer cylindrical surface 12 and a central bore 13 providing an annular cutting end 14. Three chip removal flutes 15, 16 and 17 are formed in the body extending from the end 14 axially of the body. Each flute is equipped with a cutting edge and each flute will therefore carry the chips from only its own cutting edge providing for less change of clogging due to easier chip removal by the division of the chips into smaller particles and the plurality of flutes for their removal.

Referring to the FIG. 1 embodiment, the cutters 20, 21 and 23 are located substantially the same distance radially from the axis of the drill body 10 and each extends outwardly generally radially beyond the cylindrical surface 12 of the body 10 which cylindrical surface has a size a little less than the outer diameter of the cut to be made.

The angular spacing of the cutters has been varied to produce an extra load on one cutter which becomes the control cutter. For example, assuming that the drill body rotates counterclockwise as viewed in FIG. 1, the annular spacings 27, 28 may be each 108° while the angular spacing 29 may be 144°. In this example assuming that the feed in inches per revolution is $d$, the cutter 20 will assume a load of 40% while cutters 21 and 23 assume a load of 30% each. Stated another way, cutter 20 will have a chip presented to it that is $0.4d$ high at all times. This situation is diagrammed in FIG. 2 for the specific case described (108° and 144° angular spacing). In the illustrated case the primary reaction force from cutter 20 is resisted by wear pads 25, 26. It will be apparent that other angular spacings may be used so long as the depth of cut of one cutter, determined by the angular spacing used, is greater than at the other cutters. In this embodiment the rate of penetration may be rather high and sufficient accuracy is obtained for most trepanning applications. If rate of penetration is not a factor, but extreme accuracy is desired the cutter loads should be varied by the alternate embodiment of FIGS. 3–6.

As shown in FIG. 3, the radial extent of the surface cut by the cutter 32, which is the main guiding cutter, is greater than the width of either of the other cutters, such for instance, as for example, the width of the cutter 32 being $0.4w$ and the width of the cuts taken by the other two cutters being each $0.3w$. Also the arrangement of the cutters so far as portion of the cut to be taken are shown in FIG. 4 where the inner cutter 33 takes a first cut 33′, the intermediate or middle cutter takes a cut 34′ and the main cutter 32 takes a cut 32′. An example of the relative amounts of cut taken is also there shown. Thus the cut is divided into a plurality of portions so that no undue strain is placed upon any one cutter. However, the greater strain by reason of the width of the cutter 32 is such as to direct the reactionary force as shown at 30 in FIG. 3 in the direction of the arrow there shown and this is supported by wear pads 35 and 36 put in a position to balance this thrust and engage the edge of the bore or annular hole being drilled. Thus these three means, that is the wear pads 35 and 36 and the cutter 32, provide a three-point support in a balanced relation so as to accurately guide the tool as it progresses into the work for very deep cuts. The chips taken by each cut are directed through the flutes adjacent the cutter or bits. Coolant fluid is flowed down along the inner surface 22 of the drill body and removed through the flutes 15, 16 and 17 carrying the chips from each of the cutters adjacent the flutes and thence outwardly along outer surface of the stem to which the tool is attached. By this arrangement a balancing thrust assigned to the outermost cutter by wear pads serves to guide the tool and the wear pads and cutter have a definite guiding and centering function of the tool.

I have shown in FIGS. 5 and 6 a modified form in which the tool body 40 has a generally cylindrical outer surface 41 and an inner bore 42 providing an annular end 43 upon which the cutters are provided. Flutes, in this case two, 44 and 45, are provided and on the edge of the flute 44, a cutter 46 serving as the main cutter is placed having a cutting edge 47 extending at 48 outwardly beyond the circumference of the cylindrical surface 41 but terminating short of the cylindrical surface 49 of the bore 42. This is the main guiding cutter.

A second cutter 50 is positioned at a diametrically opposite point from the cutter 47 and has a cutting edge 41 extending from a point just inwardly of the circumference 49 of the bore 42 to a point short of the circumference 41 of the body. The arrangement of these cutting edges 48 and 51 is shown somewhat better in FIG. 6 where they slightly overlap, and, as will be seen, the outer cutter or bit has its edge 48 of a radial extent greater than the radial extent of the cutting edge 51, and thus will provide a greater thrust which thrust is supported by wear pads 55 and 56 so arranged as to balance this thrust and thus the cutter 46 and pads serve as the guiding means for the drill as these elements engage the surface of the outer diameter of the annular hole which is being formed. The guide means is thus formed between the wear pads 55, 56 and the cutter 46.

In each case the guide is determined by the unbalanced cut by a larger cut on the outer cutter which its found to be very advantageous in the tool of this character.

In all the embodiments described above, it is also possible, and sometimes advisable, to reverse the flow of coolant and chip exhaust. This ould place the chip flutes on the inside of the tool body rather than on the outside as is shown.

I claim:

1. In a trepanning drill tool for drilling an annular hole having an inner diameter and an outer diameter, a drill body having a generally cylindrical outer surface of lesser diameter than said outer diameter and a central bore of a greater diameter than said inner diameter providing an annular end, means to engage the outer diameter of the annular hole and provide a three-point suspension guide for said drill body comprising a guiding cutter at said end projecting outwardly beyond the cylindrical surface of said body with the remainder of said engaging means comprising guiding wear pads projecting outwardly beyond said body and located along said cylindrical surface angularly spaced from the back of the guiding cutter to assume the reaction load from said guiding cutter and to center the body in said annular hole, at least one additional cutting means at said end arcuately spaced from said guiding cutter, said guiding cutter having a longer cutting edge than the additional cutting means thereby cutting a larger chip than the chip cut by said additional cutting means, the cutting edges of the cutting means being located in common planes at the end of the drill body, the load on said guiding cutter being the principal means directing the thrust against said guiding wear pads.

2. In a trepanning drill tool as in claim 1 wherein said additional cutting means comprises a single additional cutter diametrically opposite said guiding cutter, the width of the additional cutter being less than the width of the guiding cutter.

3. In a trepanning drill tool for drilling an annular hole having an inner diameter and an outer diameter, a drill body having a generally cylindrical outer surface of lesser diameter than said outer diameter and a central bore of a greater diameter than said inner diameter providing an annular end, a plurality of cutting edges circularly spaced about said annular end and located at different radial extents of said annular end to rotate in different annular paths, the outermost of said cutting edges having a longer cutting edge than other of said cutting edges to take the greater cutting load and to determine the direction of dominant thrust, a plurality of wear pads located at angular positions behind the outermost cutting edge to balance said thrust and together with said outermost cutting edge provide a guide for the axial movement of the drill tool into the work.

References Cited
UNITED STATES PATENTS 3,244,035  4/1966  Jehl et al. _____ 77—69

OTHER REFERENCES

Publication: Machinery, "Trepan Boring of Deep Holes," pp. 701 and 702, dated Nov. 18, 1948.

FRANCIS S. HUSAR, Primary Examiner

U.S. Cl. X.R.

145—121